June 21, 1932.  I. G. MEYER  1,864,142
REVERSE LOCK FOR DRIVING GEARS
Filed July 16, 1931  2 Sheets-Sheet 1

Inventor
Irvin G. Meyer
By Young & Young
Attorneys

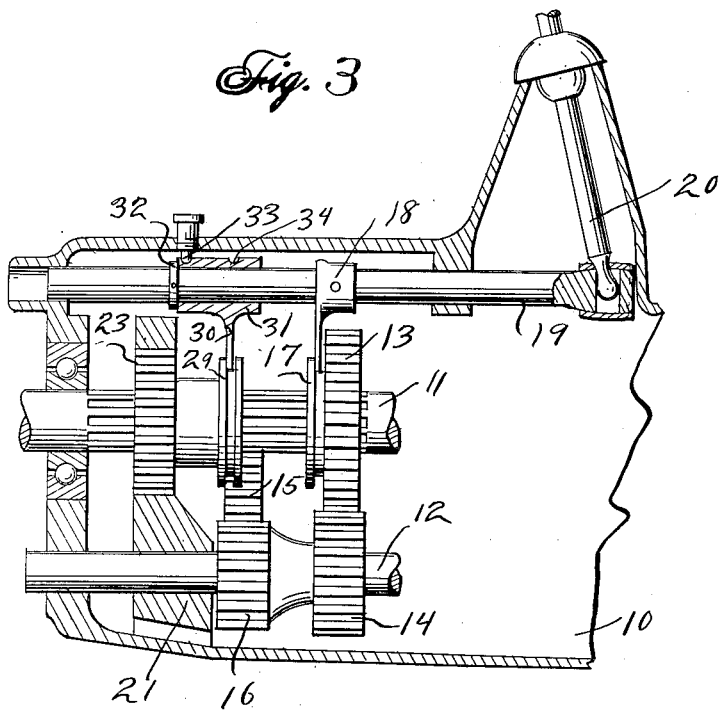
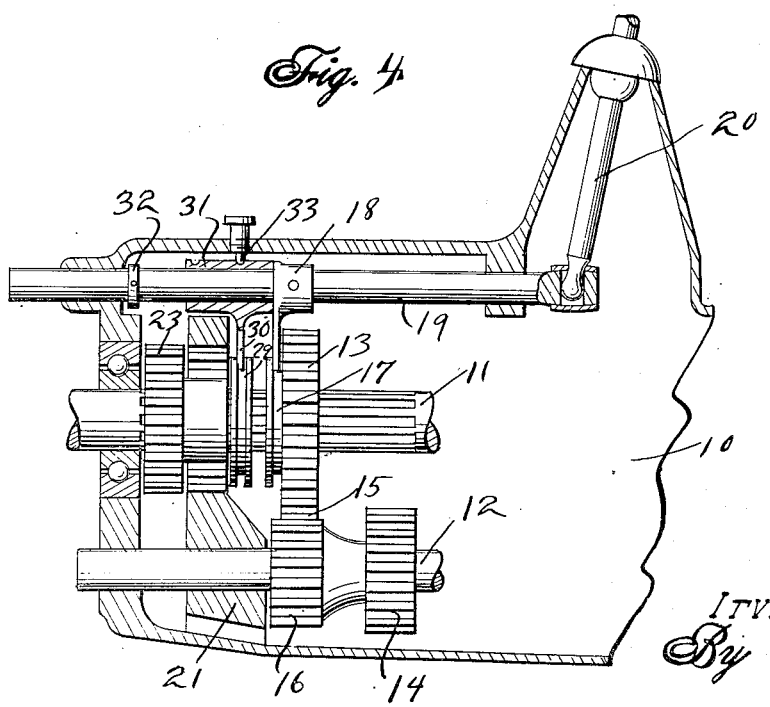

Patented June 21, 1932

1,864,142

UNITED STATES PATENT OFFICE

IRVIN G. MEYER, OF MILWAUKEE, WISCONSIN

REVERSE LOCK FOR DRIVING GEARS

Application filed July 16, 1931. Serial No. 551,174.

This invention appertains to motor vehicles and more particularly to a novel device for preventing an automobile from backing down a grade.

One of the primary objects of my invention is the provision of novel means incorporated directly in the transmission of an automobile for preventing the unintentional rolling backward of the automobile while on a grade, means being provided to render the same inoperative when the transmission is actuated for the intentional backing of the vehicle.

Another important object of my invention is the provision of a reverse lock for automobiles forming a direct part of the standard transmission of an automobile, the reverse lock being so constructed as to permit the ordinary shifting of gears and to permit the usual operation of the vehicle under all conditions, the device being only brought into play when the vehicle rolls backward down a hill without intention on the part of the operator.

A further and important object of my invention is the provision of a novel reverse lock incorporated with the conventional transmission of a motor vehicle, embodying a clutch of the automatic roller or ball type, novel means being provided for rendering the clutch inoperative when the reverse gear is actuated for bringing about the intentional backing of the vehicle.

A still further object of my invention is to provide an improved reverse lock for automobiles which can be readily associated with a transmission and which can be manipulated during the ordinary operation of the transmission, the device being of an exceptionally simple and durable character and capable of being manufactured at a reasonable cost.

With these and other objects in view, the invention consists in the novel construction, arrangement and formation of parts, as will be hereinafter more specifically described, claimed and illustrated in the accompanying drawings, in which:

Figure 3 is a view similar to Figure 1, but showing the shift gear in its engaged position for low or first speed;

Figure 4 is a view similar to Figures 1 and 3, but showing a shift gear of the transmission in its engaged reverse position, the ball or roll clutch being shown in its inoperative non-active position for permitting the intentional backing of the vehicle.

Figure 1:
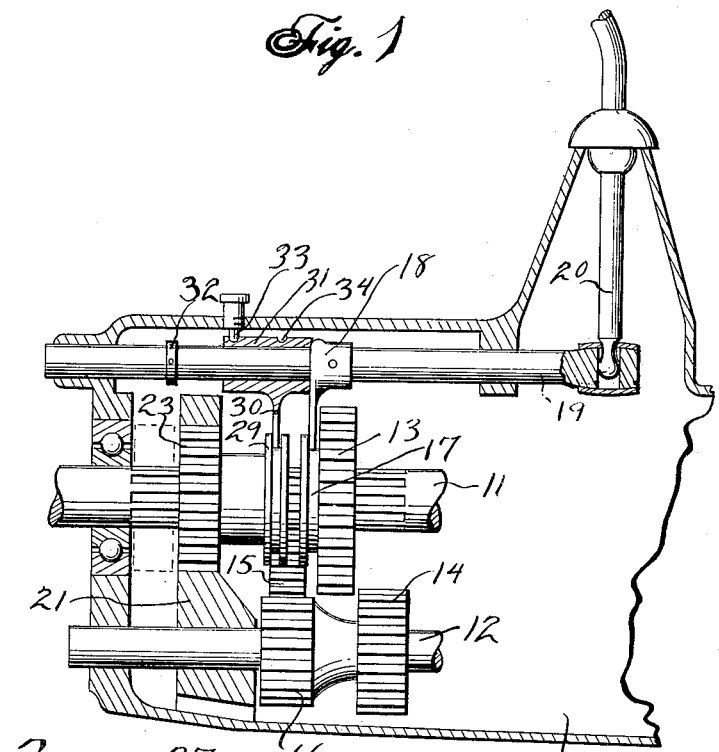
Figure 1 is a fragment longitudinal sectional view through a transmission of an automobile showing my improved device incorporated therewith, the shift gear for low and reverse speeds being shown in its neutral position.
Figure 2:
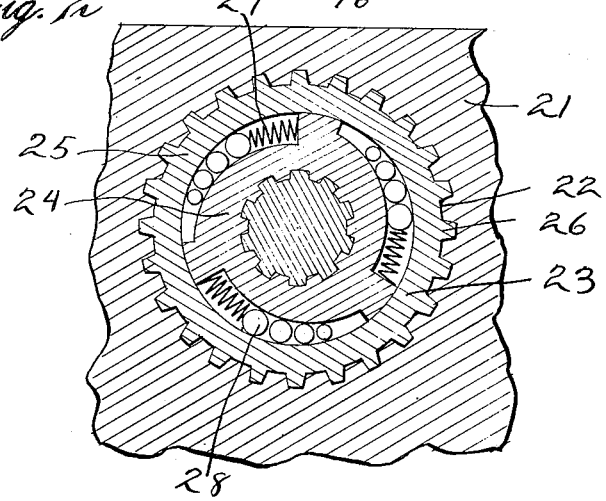
Figure 2 is an enlarged fragment transverse section through a portion of my improved reverse lock, the view illustrating in detail the construction of the roller or ball clutch.

Referring to the drawings in detail, wherein similar reference characters designate corresponding parts throughout the several views, the numeral 10 indicates the casing of a transmission which may be of the usual type, or made slightly longer to receive my novel reverse lock. As in the usual transmission constructions, the casing 10 receives the main transmission shaft 11 and the counter shaft 12. These shafts are rotatably mounted in the casing 10 in any preferred way and the shaft 11 can be connected to the propeller or drive shaft of the automobile. Only a fragment of the transmission has been shown, and the counter shaft 12 can be driven in the ordinary manner from the engine drive shaft (not shown), means being also provided for permitting the direct drive of the main shaft from the engine shaft. Feathered or splined upon the main shaft 11, is the usual shift gear 13, employed in the present instance for meshing engagement with the low or first speed gear 14, or the reverse idler gear 15. The low or first speed gear 14 is keyed or otherwise secured to the counter shaft 12 and the idler or reverse gear 15 is rotatably mounted on a stub shaft and meshes with a reverse gear 16, keyed or otherwise secured to the counter shaft. The shift gear 13 carries the shift collar 17 which is rotatably engaged by the shift yoke or spanner 18, keyed to the shift rod 19, slidably mounted in the transmission casing 10. The shift rod 19 is actuated in the ordinary manner by the shift lever 20 for moving the shift gear 13 into meshing engagement with either the gear 14 or reverse idler gear 15, or in a neutral position as shown in Figure 1 of the drawings.

The parts described are of the conventional character and in accordance with my invention, I arrange in the casing 10 a transverse stationary partition 21. This partition 21 is arranged in rear of the gears 15 and 16 and is provided with an enlarged opening, the wall of which is provided with an annular row of internal gear teeth 22. The shaft 11 extends axially through the opening in the stationary partition 21 and the shaft 11 has feathered or splined thereon at this point, the reverse lock or clutch 23. This reverse lock or clutch 23 embodies a hub portion 24 and an annular rim portion 25 having the external gear teeth 26. The gear teeth 26 are adapted to engage the gear teeth 22, at certain times, as will be later described. The hub 24 is the part of the reverse lock or clutch which is feathered on the shaft 11, and is provided with tapered peripheral ways or notches 27 which receive the ball or roller locks 28. It is obvious from the construction of the reverse lock or clutch that when the hub 24 thereof is turned in one direction by the shaft 11, that the ball or roller locks 28 will be moved to the enlarged ends of the tapered ways or notches 27, allowing the free rotation of the hub 24 relative to its rim 25. When the hub is rotated in the reverse direction by the shaft 11, the ball or roller locks will be moved to the narrow ends of the tapered ways or notches 27 and thereby frictionally lock the hub to the rim. The hub 24 has connected thereto a shift collar 29 which is engaged by a shift yoke or spanner 30, secured to or formed on a sleeve 31. The sleeve 31 is slidably mounted on the shift rod 19 in rear of the shift yoke or spanner 18. It is to be understood that the rim 25 is rotatably connected with the hub 24, but that the rim and the hub are connected for synchronous shifting movement as a single unit.

Keyed or otherwise secured to the shift rod 19 in spaced relation to the sleeve 31 is a stop collar 32 and thus it can be seen that the sleeve 31 is confined on the shift rod 19 between the shift yoke or spanner 18, and the collar 32.

The sleeve 31 is releasably locked in one of two positions by means of a spring-pressed dog 33 carried by the transmission casing 10 and the pawl or dog 33 is adapted to engage in either one of two notches 34 formed in the top face of the sleeve 31 according to the position of the sleeve.

Referring to Figure 1 of the drawings, it can be seen that the normal position of the clutch or reverse lock 23 is within the confines of the partition 21 with the teeth 26 thereof engaging the teeth 22 of the partition. Considering that the gear 13 is in neutral position, as shown in Figure 1, the spanner or shift yoke will be in engagement with the sleeve 31. If the vehicle should roll backward, the rotation of the shaft 11 would rotate the hub 24 of the reverse lock or clutch 23 in a direction to move the roller or ball locks 28 to the narrow ends of the notches 27, thereby clutching the hub 24 to its rim 25. The rim being in locking engagement with the rigid partition 21 will hold the shaft 11 against further rotation and consequently prevent the backward movement of the vehicle down the hill.

When it is desired to shift the gear 13 into first or low speed, the shift lever 20 is actuated in the ordinary manner for moving the shift rod 19 forwardly to bring the gear 13 into meshing engagement with the low speed gear 14. The forward movement of the shift rod 19 will move the stop collar 32 into engagement with the sleeve 31, but will not move the sleeve, consequently, the reverse lock or clutch 23 is still within the confines of the partition 21 and in its operative position.

Thus, during the shifting of the gears into first or low speed, backward movement of the vehicle will be prevented by said reverse lock or clutch.

When it is desired to back the vehicle, the shift rod 19 is moved rearwardly by the shift lever 20 and the gear 13 will be brought into meshing engagement with the reverse idler gear 15. This movement will slide the sleeve 31 rearwardly due to the contact of the spanner or shift yoke 18 therewith and, consequently, the reverse lock or clutch 23 will be moved rearwardly with the rod 19 and the reverse lock will be moved from out of engagement with the partition 21. This is clearly shown in Figure 4 of the drawings. The vehicle can now be moved backward safely in view of the fact that the reverse lock has been shifted to its inactive or inoperative position.

It can be seen that when the shift rod 19 is shifted back to throw the gear 13 into meshing engagement with the gear 14, that initial movement of the rod 19 will not move the reverse lock, in view of the fact that the stop collar 32 is spaced from the sleeve 31, but as the gear 13 is continued in its forward movement, the reverse lock will be brought into its operative position as shown in Figure 3 of the drawings.

From the foregoing description, it can be seen that I have provided an exceptionally simple yet durable means for insuring the unintentional backing of a vehicle down a grade.

Changes in detail may be made without departing from the spirit or the scope of this invention, but what I claim as new is:

1. The combination with a transmission including a casing, a rotatable main shaft, a rotatable counter shaft, a first speed gear on the counter shaft, a reverse gear on the counter shaft, an idler gear meshing with the reverse gear, a shift gear feathered on the main shaft movable into and out of meshing engagement with the low speed gear and the idler gear, of a stationary member in the casing having an opening, the wall of the opening being provided with an annular row of internal gear teeth, a roller clutch including a hub feathered on the main shaft, and a rim provided with gear teeth normally meshing with the gear teeth of the rigid member, and means for moving the teeth of the roller clutch out of meshing engagement with the teeth of the rigid member upon the shifting of the shift gear into engagement with the idler gear.

2. The combination with a transmission including a casing, a rotatable main shaft, a rotatable counter shaft, a low speed gear and a reverse speed gear on said counter shaft, an idler gear meshing with the reverse gear, a shift gear feathered on the main shaft movable into and out of meshing engagement with the low speed gear and the idler gear, a movable shift rod and a shift yoke secured to the shift rod operatively connected with the shift gear, of means for preventing the unintentional backing of a vehicle including a rigid member having an opening through which the main shaft extends, the wall of the opening being provided with an annular row of gear teeth, a clutch having a hub feathered on the main shaft, a rim surrounding the hub and clutch locks inter-positioned between the hub and the rim and movable into locking engagement with the hub of the rim upon rotation of the hub in one direction, teeth on the rim normally engaging the teeth of the rigid member, a collar connected with the clutch, a sleeve slidable on the shift rod in rear of the shift yoke, a stop collar connected to the shift rod in rear of the shift yoke and sleeve, and a shift collar carried by the sleeve operatively engaging said last mentioned shift collar.

3. The combination with a transmission including a casing, a rotatable main shaft, a rotatable counter shaft, a low speed gear and a reverse gear on said counter shaft, an idler gear meshing with the reverse gear, a shift gear feathered on the main shaft movable into and out of meshing engagement with the low speed gear and the idler gear, a movable shift rod and a shift yoke secured to the shift rod operatively connected with the shift gear, of means for preventing the unintentional backing of a vehicle including a rigid member having an opening through which the main shaft extends, the wall of the opening being provided with an annular row of gear teeth, a clutch having a hub feathered on the main shaft, a rim surrounding the hub and clutch locks inter-positioned between the hub and rim and movable into locking engagement with the hub of the rim upon rotation of the hub in one direction, teeth on the rim normally engaging the teeth of the rigid member, a collar connected with the clutch, a sleeve slidable on the shift rod in rear of the shift yoke, and a stop collar connected to the shift rod in rear of the shift yoke and sleeve, a shift collar carried by the sleeve operatively engaging said last mentioned shift collar, and means for releasably locking the sleeve in one of two positions.

In testimony that I claim the foregoing I have hereunto set my hand at Milwaukee, in the county of Milwaukee and State of Wisconsin.

IRVIN G. MEYER.